(12) United States Patent
Abbott

(10) Patent No.: US 12,246,414 B2
(45) Date of Patent: Mar. 11, 2025

(54) MULTI-SIZE TOOL BIT HOLDER FOR A ROTARY POWER TOOL

(71) Applicant: MILWAUKEE ELECTRIC TOOL CORPORATION, Brookfield, WI (US)

(72) Inventor: Jonathan E. Abbott, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 143 days.

(21) Appl. No.: 17/713,672

(22) Filed: Apr. 5, 2022

(65) Prior Publication Data

US 2022/0226973 A1 Jul. 21, 2022

Related U.S. Application Data

(63) Continuation of application No. 17/277,782, filed as application No. PCT/US2019/055712 on Oct. 10, 2019, now Pat. No. 11,292,109.

(60) Provisional application No. 62/743,937, filed on Oct. 10, 2018.

(51) Int. Cl.
*B25B 23/00* (2006.01)
(52) U.S. Cl.
CPC ................. *B25B 23/0035* (2013.01)
(58) Field of Classification Search
CPC .................................................. B25B 23/0035
See application file for complete search history.

(56) References Cited

U.S. PATENT DOCUMENTS

| | | | |
|---|---|---|---|
| 6,092,814 A | 7/2000 | Kageler | |
| 6,539,826 B2 * | 4/2003 | Oesterle | B25B 13/44 |
| | | | 81/90.2 |
| 7,387,051 B1 | 6/2008 | Chiang | |
| 7,392,727 B1 * | 7/2008 | Chiang | B25B 23/12 |
| | | | 173/132 |

(Continued)

FOREIGN PATENT DOCUMENTS

| JP | 2001225282 A | 8/2001 |
|---|---|---|
| JP | 2017087334 A | 5/2017 |

OTHER PUBLICATIONS

International Search Report and Written Opinion for Application No. PCT/US2019/055712 dated Jan. 31, 2020 (7 pages).

(Continued)

*Primary Examiner* — Hadi Shakeri
(74) *Attorney, Agent, or Firm* — Michael Best & Friedrich LLP

(57) ABSTRACT

A multi-size tool bit holder includes a first sleeve with a first bit holding bore extending along an axis and a first accommodating bore extending through a sidewall of the first bit holding bore, a second sleeve coupled for co-rotation with the first sleeve and movable relative to the first sleeve between a first position and a second position, the second sleeve including a second bit holding bore extending along the axis and a second accommodating bore extending through a sidewall of the second bit holding bore, and a retaining element. The retaining element has a first securing position in which the retaining element extends through the first and second accommodating bores when the second sleeve is in the first position and into a groove in a bit shank to axially secure the bit shank within the second sleeve.

18 Claims, 11 Drawing Sheets

(56) References Cited

U.S. PATENT DOCUMENTS

| | | | | |
|---|---|---|---|---|
| 7,448,302 B2* | 11/2008 | Huang | ................ | B25B 23/0035 |
| | | | | 81/177.85 |
| 7,913,590 B2* | 3/2011 | Lin | .................... | B25B 23/0035 |
| | | | | 81/177.85 |
| 8,196,495 B2 | 6/2012 | Chen | | |
| 8,366,122 B2* | 2/2013 | Lee | ....................... | B23B 31/107 |
| | | | | 279/74 |
| 9,463,558 B2 | 10/2016 | Yang | | |
| 2011/0101629 A1 | 5/2011 | Wienhold | | |
| 2012/0137837 A1 | 6/2012 | Souma | | |
| 2014/0027987 A1 | 1/2014 | Wienhold | | |
| 2015/0151412 A1 | 6/2015 | Chen | | |

OTHER PUBLICATIONS

Protool Reviews, "Klein 2-in-1 Hex Head Slide Driver," <https://www.protoolreviews.com/tools/hand/drivers-wrenches/klein-2-in-1-hex-head-slide-driver/32014/> web page publicly available at least as early as Aug. 7, 2017.

* cited by examiner

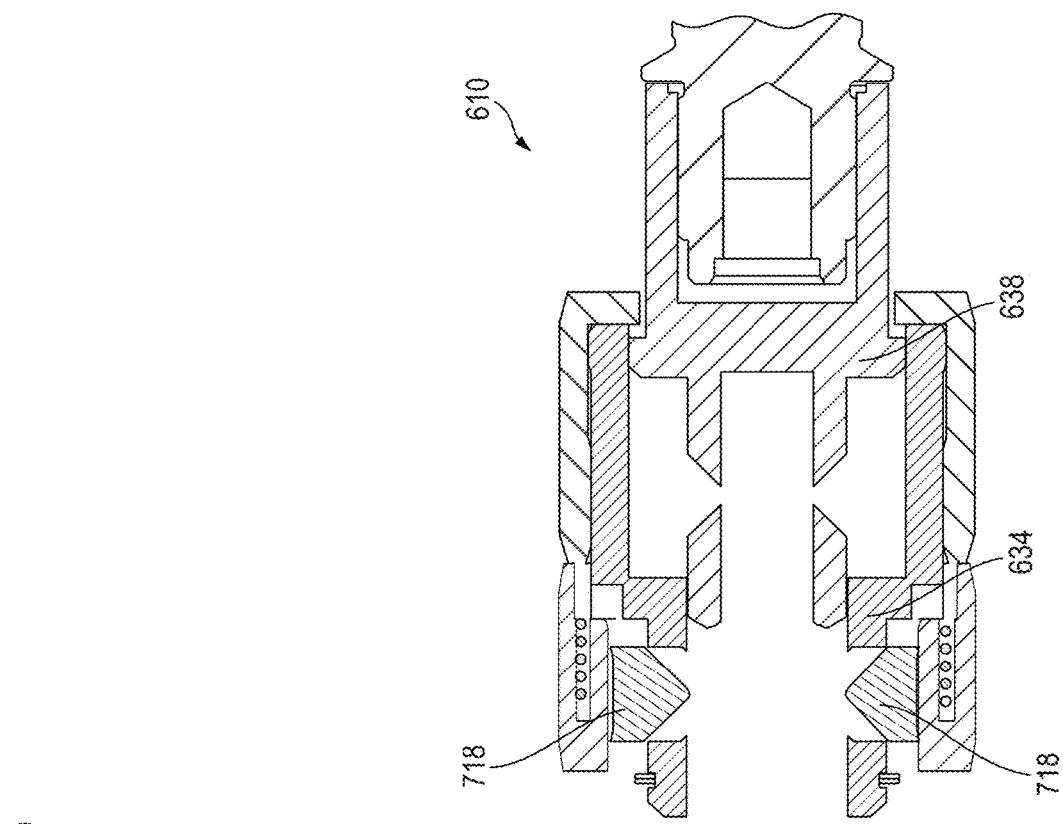
FIG. 10B (NEW)
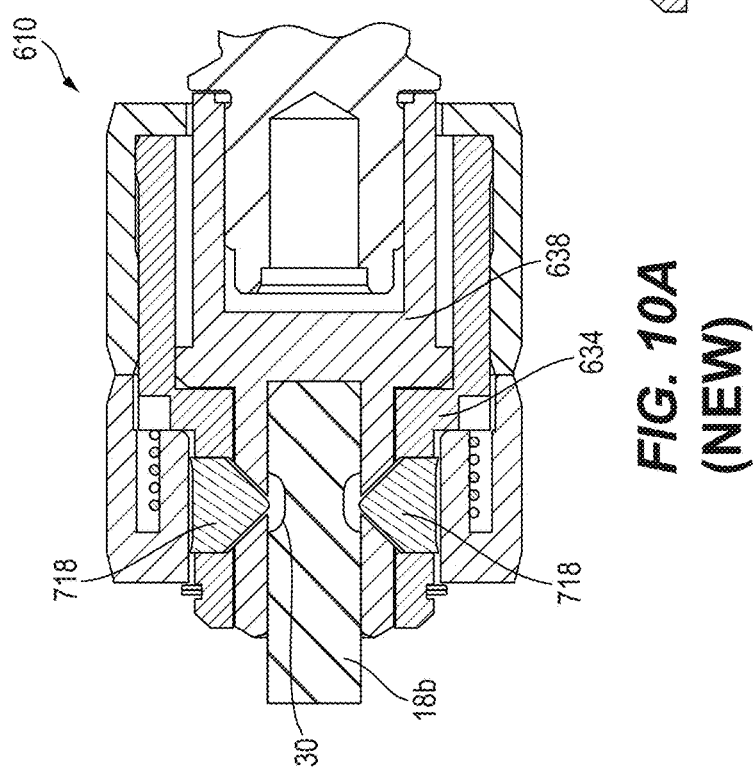
FIG. 10A (NEW)

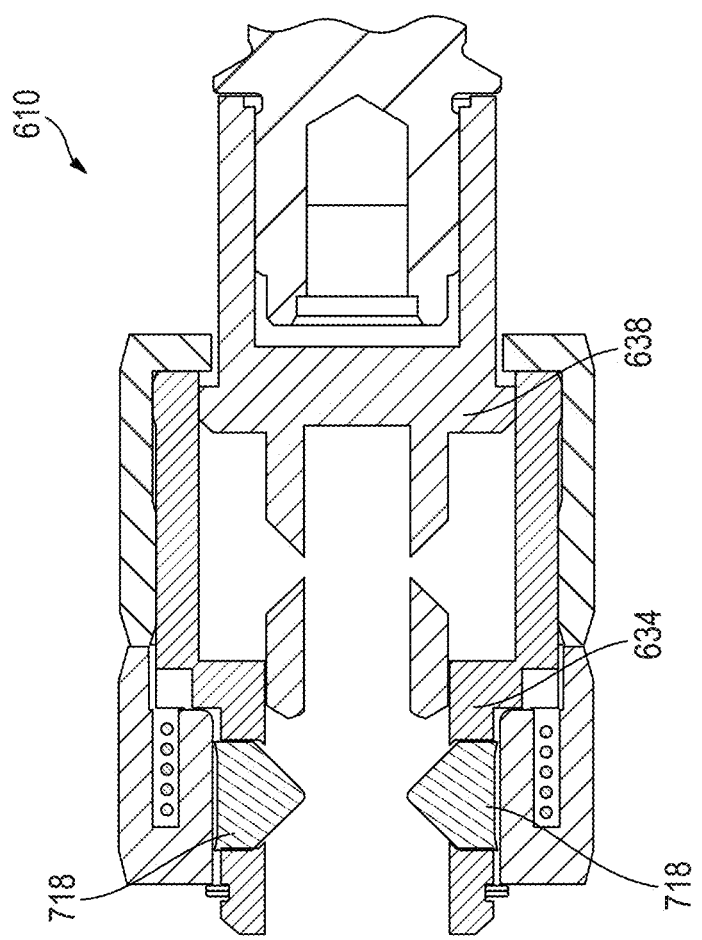
FIG. 10C (NEW)

MULTI-SIZE TOOL BIT HOLDER FOR A ROTARY POWER TOOL

CROSS-REFERENCE TO RELATED APPLICATIONS

This application is a continuation of co-pending U.S. patent application Ser. No. 17/277,782, filed Mar. 19, 2021, issued as U.S. Pat. No. 11,292,109, which is a national phase filing under 35 U.S.C. 371 of International Application No. PCT/US2019/055712, filed on Oct. 10, 2019, which claims priority to U.S. Provisional Patent Application No. 62/743,937, filed on Oct. 10, 2018, the entire contents of all of which are incorporated herein by reference.

FIELD OF THE INVENTION

The present invention relates to tool bit holders, and more particularly to tool bit holders for rotary power tools.

BACKGROUND OF THE INVENTION

Power tools having a rotational output (i.e. rotary power tools) typically include chuck assemblies with a plurality of jaws that are adjustable to grip and secure a tool bit (e.g., a drill bit). Some chuck assemblies are configured to accept a continuous range of bit sizes (referred to herein as "continuously variable chucks"). Continuously variable chucks are versatile but can be relatively heavy, large, and expensive to produce. In addition, changing bits requires loosening and then retightening the chuck. Other chuck assemblies or tool bit holders are configured to accept one standard size of hex-shanked bits. By taking advantage of a standard shank geometry, such bit holders can be optimized to reduce weight, size, manufacturing cost, and time required to change bits as compared to continuously variable chucks. However, multiple standard nominal sizes exist for hex-shanked bits. For example, ¼-inch hex bits are commonly used for fastener driver, drill, and accessory bits, and ⁷⁄₁₆-inch hex bits may be used for higher torque applications.

SUMMARY OF THE INVENTION

A need exists for a tool bit holder able to accept multiple standard sized bit shanks without suffering the disadvantages of continuously variable chucks.

The present invention provides, in one aspect, a multi-size tool bit holder including a first sleeve with a first bit holding bore extending along an axis and a first accommodating bore extending through a sidewall of the first bit holding bore. The multi-size tool bit holder also includes a second sleeve coupled for co-rotation with the first sleeve and movable relative to the first sleeve between a first position and a second position. The second sleeve includes a second bit holding bore extending along the axis and a second accommodating bore extending through a sidewall of the second bit holding bore. The multi-size tool bit holder also includes a retaining element. A first bit shank of a first nominal size is insertable into the first bit holding bore when the second sleeve is in the second position to secure the first bit shank within the first sleeve, a second bit shank of a second nominal size different than the first nominal size is insertable into the second bit holding bore when the second sleeve is in the first position to secure the second bit shank within the second sleeve, and the retaining element has a first securing position in which the retaining element extends through the first and second accommodating bores when the second sleeve is in the first position and into a groove in the second bit shank to axially secure the second bit shank within the second sleeve.

The present invention provides, in another aspect, a multi-size tool bit holder including a first sleeve with a first bit holding bore extending along an axis, a second sleeve coupled for co-rotation with the first sleeve and movable relative to the first sleeve between a first position and a second position, the second sleeve including a second bit holding bore, a plurality of retaining elements movable between a first securing position in which the retaining elements project into the second bit holding bore, a first release position in which the retaining elements are withdrawn from the second bit holding bore, a second securing position in which the retaining elements project into the first bit holding bore, and a second release position in which the retaining elements are withdrawn from the first bit holding bore, and a collar surrounding the first sleeve.

Other features and aspects of the invention will become apparent by consideration of the following detailed description and accompanying drawings.

BRIEF DESCRIPTION OF THE DRAWINGS

FIG. 10A is a cross-sectional view of the tool bit holder of FIG. 10, with the plurality of retaining elements illustrated in a first release position.

FIG. 10B is a cross-sectional view of the tool bit holder of FIG. 10, with the plurality of retaining elements illustrated in a second release position.

FIG. 10C is a cross-sectional view of the tool bit holder of FIG. 10, with the plurality of retaining elements illustrated in a second securing position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
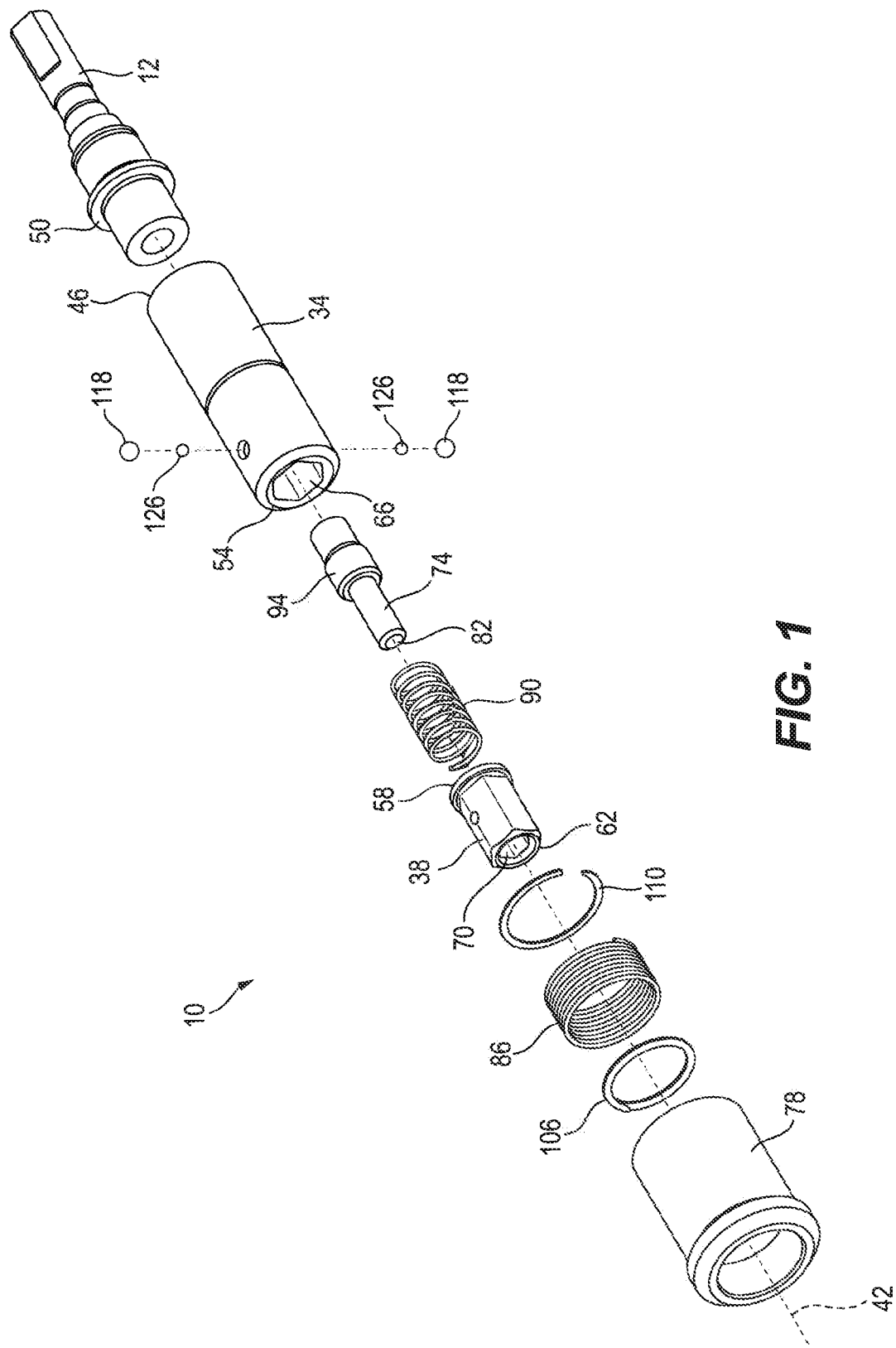
FIG. 1 is an exploded view of a tool bit holder according to an embodiment of the invention.
Figure 2:
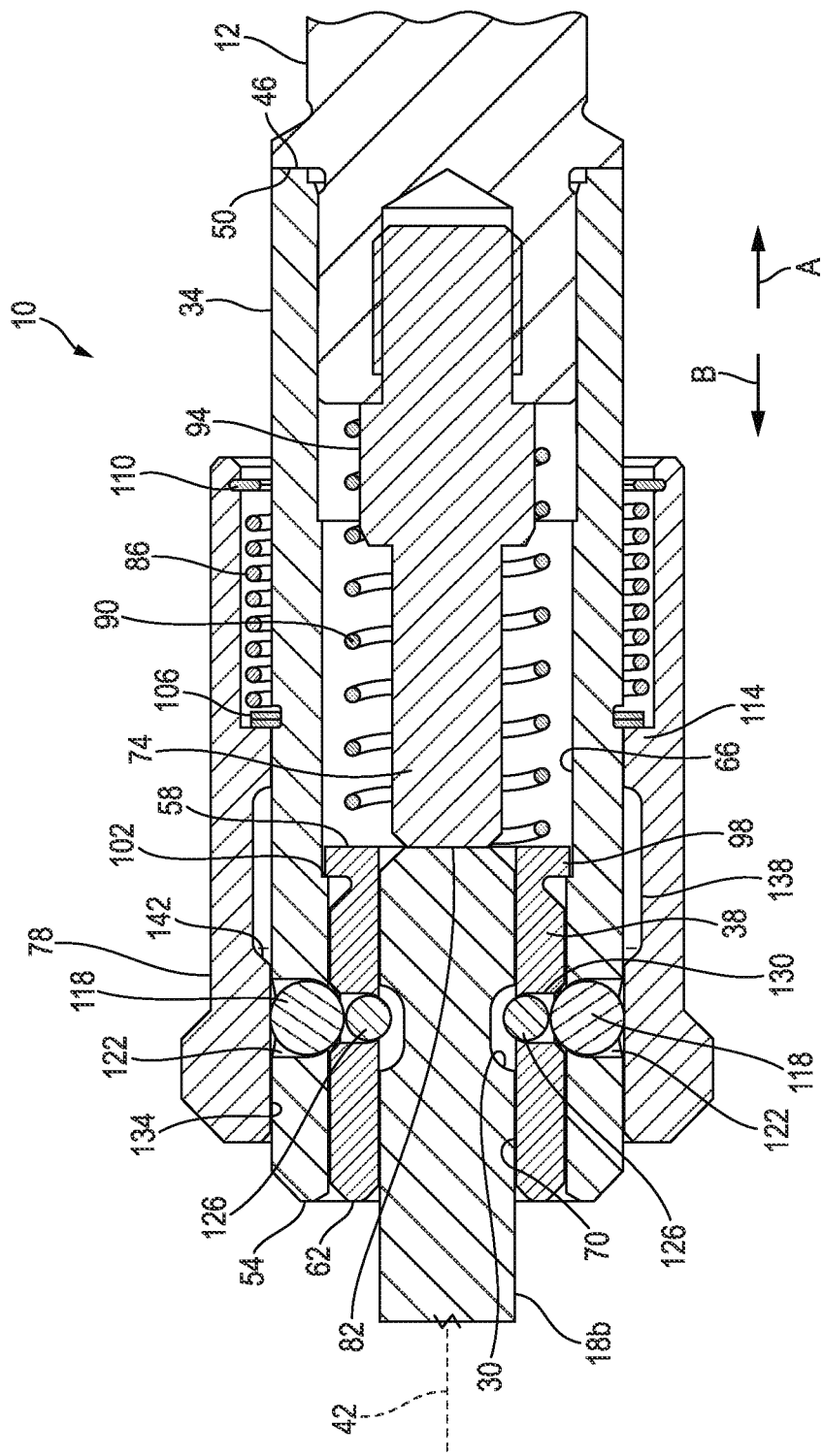
FIG. 2 is a cross-sectional view of the tool bit holder of FIG. 1 retaining a shank of a second nominal size.
Figure 3:
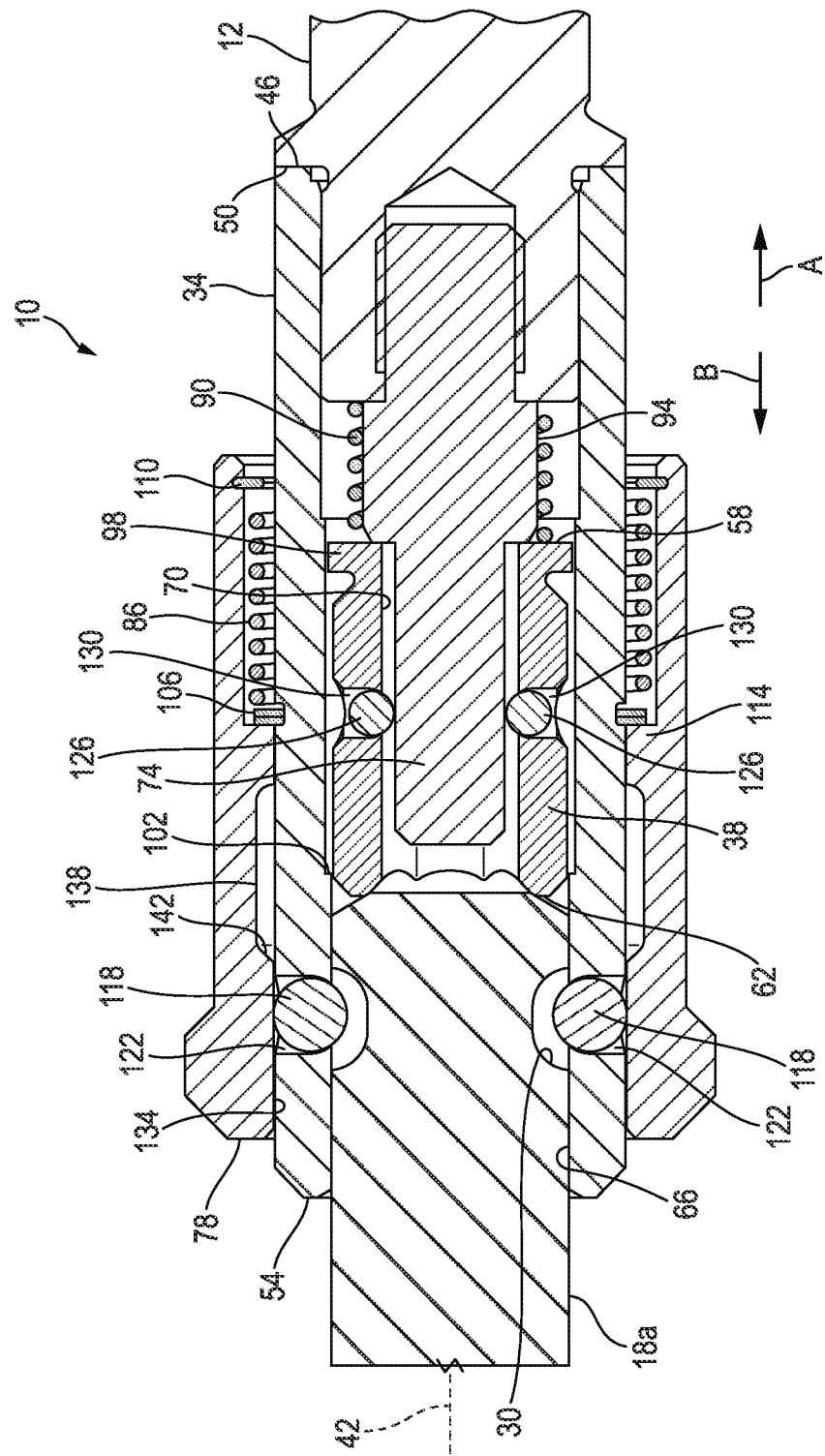
FIG. 3 is a cross-sectional view of the tool bit holder of FIG. 1 retaining a shank of a first nominal size.
Figure 5:
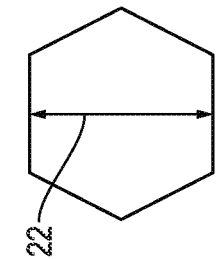
FIG. 5 is a diagram illustrating two different nominal sizes of shanks that may be used on the tool bit of FIG. 2.
Figure 5:
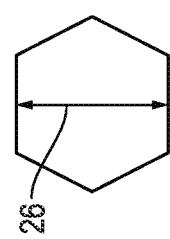
Figure 4:
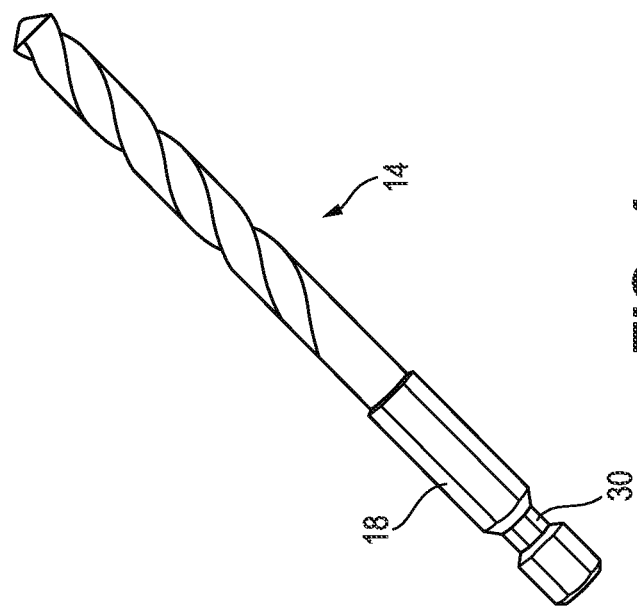
FIG. 4 is a perspective view of an exemplary tool bit that can be retained by the tool bit holder of FIG. 1.

FIGS. 1-3 illustrate a tool bit holder 10 including a spindle 12 for connection to a rotational output of a rotary power tool (e.g., a drill, impact driver, etc.; not shown). The spindle 12 may be integrated into the rotary power tool and removably coupled to the remainder of the tool bit holder 10 by any suitable means. In some embodiments, the spindle 12 may be removably coupled to the rotary power tool. The bit holder 10 is configured to receive and secure tool bits with standardized shanks of at least two different predetermined, nominal sizes. For example, the illustrated bit holder 10 is configured to receive a tool bit 14 with a hexagonal shank 18 that can be either a first nominal size 22 or a second nominal size 26 (FIGS. 4 and 5). The first and second nominal sizes 22, 26 are preferably standard hexagonal shank sizes, such as 7/16-inch and 1/4-inch, and the illustrated shank 18 also includes a groove 30. In other embodiments, the bit holder 10 may be configured to receive tool bits with other types of shanks (e.g., square, three-flat, round, etc.). In addition, the bit holder 10 may be configured to receive tool bits of three or more different nominal shank sizes.

Referring to FIG. 1, the bit holder 10 includes a first sleeve 34 and a second sleeve 38 coupled for co-rotation with the spindle 12 about a longitudinal axis 42. The first sleeve 34 has a first or back end 46 engaged with a shoulder 50 on the spindle 12, and a second or front end 54 opposite the back end 46. The first sleeve 34 is fixed to the spindle 12 (e.g., by press-fitting, welding, brazing, or via one or more inter-engaging features or fasteners, such as screws or pins). In other embodiments, the first sleeve 34 may be integrally formed as a single piece with the spindle 12. The second sleeve 38 is slidably received within the first sleeve 34 and includes a first or back end 58 facing the spindle 12 and a second or front end 62 opposite the back end 58. In the illustrated embodiment, the second sleeve 38 is shorter in length than the first sleeve 34, and therefore can be received in its entirety within the first sleeve 34 (FIG. 3). In other embodiments, the second sleeve 38 may be configured to protrude at least partially from the first sleeve 34.

A first bit holding bore 66 extends longitudinally into the first sleeve 34 from the front end 54, and a second bit holding bore 70 extends longitudinally into the second sleeve 38 from the front end 62. In the illustrated embodiment, the bit holding bores 66, 70 extend entirely through the respective sleeves 34, 38. A bit shank 18a of a first size (e.g., the nominal size 22) is receivable within the first bit holding bore 66 (FIG. 3), and a bit shank 18b of a second size (e.g., the nominal size 26) is receivable within the second bit holding bore 70 (FIG. 2). Thus, in the illustrated embodiment, the bit shank 18b has a smaller nominal size than the bit shank 18a. The bit holding bores 66, 70 each have an inner geometric profile (e.g., a hexagonal profile, a splined profile, a triangular profile, a square profile, etc.) corresponding with an outer geometric profile of the bit shanks 18a, 18b such that insertion of the bit shanks 18a, 18b into the respective sleeves 34, 38 couples the bit shanks 18a, 18b for co-rotation with the sleeves 34, 38. In some embodiments, the inner geometric profile of one or both bit holding bores 66, 70 may be configured to engage only a subset of surfaces on the corresponding bit shank 18a, 18b. In some embodiments, the inner geometric profiles of the respective bit holding bores 66, 70 may be the same, or the inner geometric profiles of the respective bit holding bores 66, 70 may differ.

The second sleeve 38 is movable between a first position (FIG. 2), in which the front end 62 of the second sleeve 38 is generally flush with the front end 54 of the first sleeve 34, and a second or retracted position (FIG. 3), in which the second sleeve 38 is moved toward the spindle 12 such that the front end 62 of the second sleeve 38 is recessed behind the front end 54 of the first sleeve 34. When the second sleeve 38 is in the first position, the tool bit holder 10 is configured to receive the smaller bit shank 18b within the bit holding bore 70 of the second sleeve 38. When the second sleeve 38 is in the second position, the tool bit holder 10 is configured to receive the larger bit shank 18a within the bit holding bore 66 of the first sleeve 34.

Referring to FIGS. 2 and 3, the bit holder 10 further includes a plunger 74 extending from a front end of the spindle 12 and a collar 78 surrounding the first sleeve 34. The plunger 74 is fixed to the spindle 12; or, in some embodiments, the plunger 74 may be integrally formed as a single piece with the spindle 12. A front end 82 of the plunger 74 defines a back stop that engages a rear end of the bit shank 18b when the bit shank 18b is inserted into the second bit holding bore 70 (FIG. 2). In other embodiments, the plunger 74 may be omitted. In such embodiments, the second bit holding bore 70 is a blind bore, the end of which defines a back stop to engage the rear end of the bit shank 18b. The collar 78 is axially movable along the first sleeve 34 and is biased rearward in the illustrated embodiment (i.e. in the direction of arrow A) by a first spring 86. In other embodiments, the collar 78 may be configured to be biased forward (i.e. in the direction of arrow B) by the first spring 86. A second spring 90 surrounds the plunger 74 and spans between the back end 58 of the second sleeve 38 and the front end of the spindle 12. The second spring 90 biases the second sleeve 38 forward (i.e. in the direction of arrow B).

In the illustrated embodiment, the plunger 74 includes a spring seat 94 that radially constrains an inner diameter of the second spring 90. In other embodiments, the second spring 90 may be radially constrained on its outer diameter (e.g., by the interior wall of the first sleeve 34). In some embodiments, the second spring 90 may be a conical spring to facilitate centering the second spring 90 within the first sleeve 34. Alternatively, the second spring 90 may include two or more stepped cylindrical portions, or the second spring 90 may be a wave spring or any other suitable type of spring for biasing the second sleeve 38. In yet other embodiments, the second spring 90 may include a plurality of springs (e.g., coil springs) arranged about an periphery of the first sleeve 34. In such embodiments, each of the plurality of springs may be accommodated in a respective pocket, groove, or the like.

With reference to FIG. 3, a front end of the illustrated spring seat 94 also defines a back stop that limits movement of the second sleeve 38 to the second position. Forward movement of the second sleeve 38 is limited to the first position by engagement between a radial flange 98 adjacent the rear end 58 of the second sleeve 38 and an internal shoulder 102 in the first sleeve 34. In alternative embodiments, a retaining ring, a friction ring (e.g., a ring of elastomeric material), projecting pin, or any other suitable means may be provided to limit forward and/or rearward movement of the second sleeve 38 within the first sleeve 34. In other embodiments, the second spring 90 may itself limit rearward movement of the second sleeve 38 (e.g., when the second spring 90 is fully compressed).

The first spring 86 is received between the collar 78 and the first sleeve 34. Extending between a first retaining ring 106 coupled to the exterior of the first sleeve 34 and a second retaining ring 110 coupled to an interior of the collar 78, the first spring 86 bears against the second retaining ring 110 to bias the collar 78 rearward (in the direction of arrow A). Rearward movement of the collar 78 is limited by engagement between the first retaining ring 106 and an interior wall 114 of the collar 78 to define an initial position of the collar 78. Forward movement of the collar 78 (in the direction of arrow B) is limited by full compression of the first spring 86 between the first and second retaining rings 106, 110 to define an actuated position of the collar 78 (not shown). One or more washers (not shown) may be provided between either or both the retaining rings 106, 110 and the first spring 86 to increase axial retention of the first spring 86. In some embodiments, either or both of the retaining rings 106, 110 may be replaced by integral shoulders formed on the collar 78 or the first sleeve 34. In addition, other projections, shoulders, or the like may be provided to limit movement of the collar 78 relative to the sleeve 34.

With continued reference to FIGS. 2 and 3, a plurality of first retaining elements 118 is received in a plurality of first accommodating bores 122 extending radially through the first sleeve 34. A plurality of second retaining elements 126 is received in a plurality of second accommodating bores 130 extending radially through the second sleeve 38. In the illustrated embodiment, the first retaining elements 118 and the second retaining elements 126 are ball bearings. Alternatively, one or more of the retaining elements 118, 126 may be pins or other solid bodies. In some embodiments, one or more of the retaining elements 118, 126 may include a resilient portion configured to bias the retaining element toward a particular position. For example, in some embodiments, the first retaining elements 118 may be coupled to or integrally formed with the free ends of a snap-ring.

The first retaining elements 118 are engageable with the groove 30 in the first bit shank 18*a* to axially retain the first bit shank 18*a* in the first sleeve 34 (FIG. 3). Likewise, the second retaining elements 126 are engageable with the groove 30 in the second bit shank 18*b* to axially retain the second bit shank 18*b* in the second sleeve 38. The illustrated bit holder 10 includes two first retaining elements 118 and two first accommodating bores 122, disposed on opposite sides of the first sleeve 34 (i.e. offset from each other by 180 degrees). Likewise, the bit holder 10 includes two second retaining elements 126 and two second accommodating bores 130, disposed on opposite sides of the second sleeve 38. In other embodiments, the number or spacing of the first retaining elements 118 and first accommodating bores 122, and the second retaining elements 126 and second accommodating bores 130, may vary. For example, in some embodiments only one first retaining element 118 and/or one second retaining element 126 may be used. In some embodiments, the retaining elements 118, 126 may be configured to engage other portions of the bit shanks 18*a*, 18*b*, such as flats or corners of the bit shanks 18*a*, 18*b*.

Each of the first retaining elements 118 and the second retaining elements 122 is movable in a radial direction (i.e. a direction transverse to the axis 42) between a securing position (illustrated in FIGS. 2 and 3) and a release position (not shown). In the securing position, the first retaining elements 118 project at least partially into the first bit holding bore 66. Likewise, the second retaining elements 122 project at least partially into the second bit holding bore 70 when in the securing position. When the collar 78 is in the initial position, as illustrated in FIGS. 2 and 3, an annular engagement surface 134 of the collar 78 overlies the first accommodating bores 122 in the radial direction. As such, the engagement surface 134 prevents the first retaining elements 118 from moving to the release position. When the second sleeve 38 is in the first position (FIG. 2), the first retaining elements 118 overlie the second accommodating bores 130 in the radial direction. As such, when the first retaining elements 118 are held in the securing position by the collar 78, the first retaining elements 118 prevent the second retaining elements 126 from moving to the release position. When the collar 78 is moved to the actuated position (not shown), a relief 138 in the collar 78 aligns with the first accommodating bores 122. The first retaining elements 118 can then move outward into the relief 138 to the release position, which in turn allows the second retaining elements 126 to move outward to the release position. In other embodiments, the collar 78 may be movable to the actuated position by rotating the collar 78 about the axis, by moving the collar 78 in a radial direction.

In use, to couple a tool bit 14 with the first, larger bit shank 18*a* to the bit holder 10, a user first moves the collar 78 forward (in the direction of arrow B) toward the actuated position, against the biasing force of the first spring 86. This aligns the relief 138 with the first accommodating bores 122. The user then inserts the bit shank 18*a* into the first bit holding bore 66. The rear end of the bit shank 18*a* bears against the front end 62 of the second sleeve 38 and moves the second sleeve 38 rearward (in the direction of arrow A) toward the second position (FIG. 3). This compresses the second spring 90.

As the bit shank 18*a* continues to be inserted in the direction of arrow A, the bit shank 18*a* encounters the first retaining elements 118 and pushes them radially outward and into the relief 138, such that the first retaining elements 118 are moved to the release position. This allows the back end of the bit shank 18*a* to clear the first retaining elements 118. The bit shank 18*a* is fully inserted when the second sleeve 38 reaches the second position and engages the spring seat 94 on the plunger 74. At this point, the groove 30 in the bit shank 18*a* aligns with the first accommodating bores 122. The user can then release the collar 78, which returns forward to the initial position under the influence of the first spring 86. An angled transition surface 142 between the relief 138 and the annular engagement surface 134 of the collar 78 bears against the first retaining elements 118. This displaces the first retaining elements 118 inward to the secured position such that the first retaining elements 118 project into the groove 30 (FIG. 3), thereby axially retaining the bit shank 18*a*. In some embodiments, the second sleeve 38 may be configured to transmit axial impacts from the spindle 12 to the bit shank 18*a* (e.g., when the bit holder 10 is used in conjunction with a hammer drill or rotary hammer, for example). The front end 62 of the second sleeve 38 is chamfered, which prevents the back end of the bit shank 18*a* from marring the second bit holding bore 70. In some alternative embodiments, the rear end of the bit shank 18*a* may engage the front end 82 of the plunger 74 when fully inserted.

The engagement surface 134 of the collar 78 prevents the first retaining elements 118 from moving back to the release position until the user desires to remove the tool bit 14 by moving the collar 78 to the actuated position where the first retaining elements 118 are again aligned with the relief 138. The tool bit 14 can then be pulled in the direction of arrow B, which moves the retaining elements 118 into the relief 138 to clear the groove 30. Removal of the tool bit 14 is assisted by the second sleeve 38, which pushes against the back end of the bit shank 18a under the influence of the second spring 90. In some embodiments, a friction ring may be provided in the first sleeve 34 to prevent the tool bit 14 from falling out of the bit holder 10 under the influence of the second spring 90 without additional pulling force exerted on the bit 14 by the user.

To couple a tool bit 14 with the second, smaller bit shank 18b to the bit holder 10, the user again moves the collar 78 forward (in the direction of arrow B) toward the actuated position, against the biasing force of the first spring 86. This aligns the relief 138 with the first accommodating bores 122. The user then inserts the bit shank 18b into the second bit holding bore 70. At this point, the second sleeve 38 is in the first position (FIG. 2), under the influence of the second spring 90. As the bit shank 18b continues to be inserted in the direction of arrow A, the bit shank 18b encounters the second retaining elements 126 and pushes them radially outward through the second accommodating bores 122. The second retaining elements 126 bear against the first retaining elements 118, and push the first retaining elements 118 into the relief 138, such that the first retaining elements 118 and the second retaining elements 126 are moved to the release position. This allows the back end of the bit shank 18b to clear the second retaining elements 126.

The bit shank 18b is fully inserted when the back end of the bit shank 18b engages the front end 82 of the plunger 74. At this point, the groove 30 in the bit shank 18b aligns with the second accommodating bores 130. The user can then release the collar 78, which returns to the initial position under the influence of the first spring 86. The first retaining elements 118 move inward to the secured position and bear against the second retaining elements 126, which moves the second retaining elements 126 inward to the secured position. The second retaining elements 126 project into the groove 30, thereby axially retaining the bit shank 18b. The plunger 74 may be configured to transmit axial impacts from the spindle 12 to the bit shank 18b (e.g., when the bit holder 10 is used in conjunction with a hammer drill or rotary hammer, for example).

The engagement surface 134 of the collar 78 prevents the first retaining elements 118 and the second retaining elements 126 from moving back to the release position until the user desires to remove the tool bit 14 by moving the collar 78 to the actuated position where the first and second actuating elements 118, 126 are aligned with the relief 138. The tool bit 14 can then be pulled in the direction of arrow B, which moves the retaining elements 126, 118 outward to clear the groove 30.

With reference to FIGS. 2 and 3, in some embodiments, the plunger 74 may assist in ejecting the bit shank 18b from the second sleeve 38 and/or the bit shank 18a from the first sleeve 34. In such embodiments, the plunger 74 may be movable relative to the first sleeve 34 and biased in the direction of arrow B (e.g., by an additional spring; not shown). For example, referring to FIG. 2, when a tool bit 14 with the second bit shank 18b is coupled to the tool bit holder 10, the end 82 of the plunger 74 may engage the rear end of the bit shank 18b to move the bit shank 18b forward in the direction of arrow B when the collar 78 is moved to the actuated position. This may advantageously prevent the second retaining elements 126 from re-engaging with the groove 30 if the user releases the collar 78 before withdrawing the tool bit 14. In addition, with reference to FIG. 3, when a tool bit 14 with the bit shank 18a is coupled to the tool bit holder 10, both the plunger 74 and the second sleeve 38 may push against the back end of the bit shank 18a to aid in removal of the tool bit 14.

In some embodiments, the end 82 of the plunger 74 may include a magnet. The magnet may be embedded or molded within the end 82 of the plunger 74, or received in a recess in the end 82 of the plunger 74. In some embodiments, the magnet may be fixed to the end 82 of the plunger 74 by epoxy or other suitable adhesive, brazing, one or more fasteners, or any other suitable means. The magnet may retain either of the bit shanks 18a, 18b in the respective bit holding bores 66, 70. As well as providing additional security for bit shanks 18a, 18b including the groove 30, providing the magnet at the end 82 of the plunger 74 may advantageously allow the tool bit holder 10 to also retain bit shanks without a groove 30.

In some embodiments, the tool bit holder 10 may include a third sleeve (not shown) received within and movable relative to the second sleeve 38 in generally the same manner that the second sleeve 38 is received within and movable relative to the first sleeve 34. In such embodiments, the tool bit holder 10 is configured to receive and retain tool bit shanks of three different nominal sizes, generally in the same manner described above.

Figure 6:
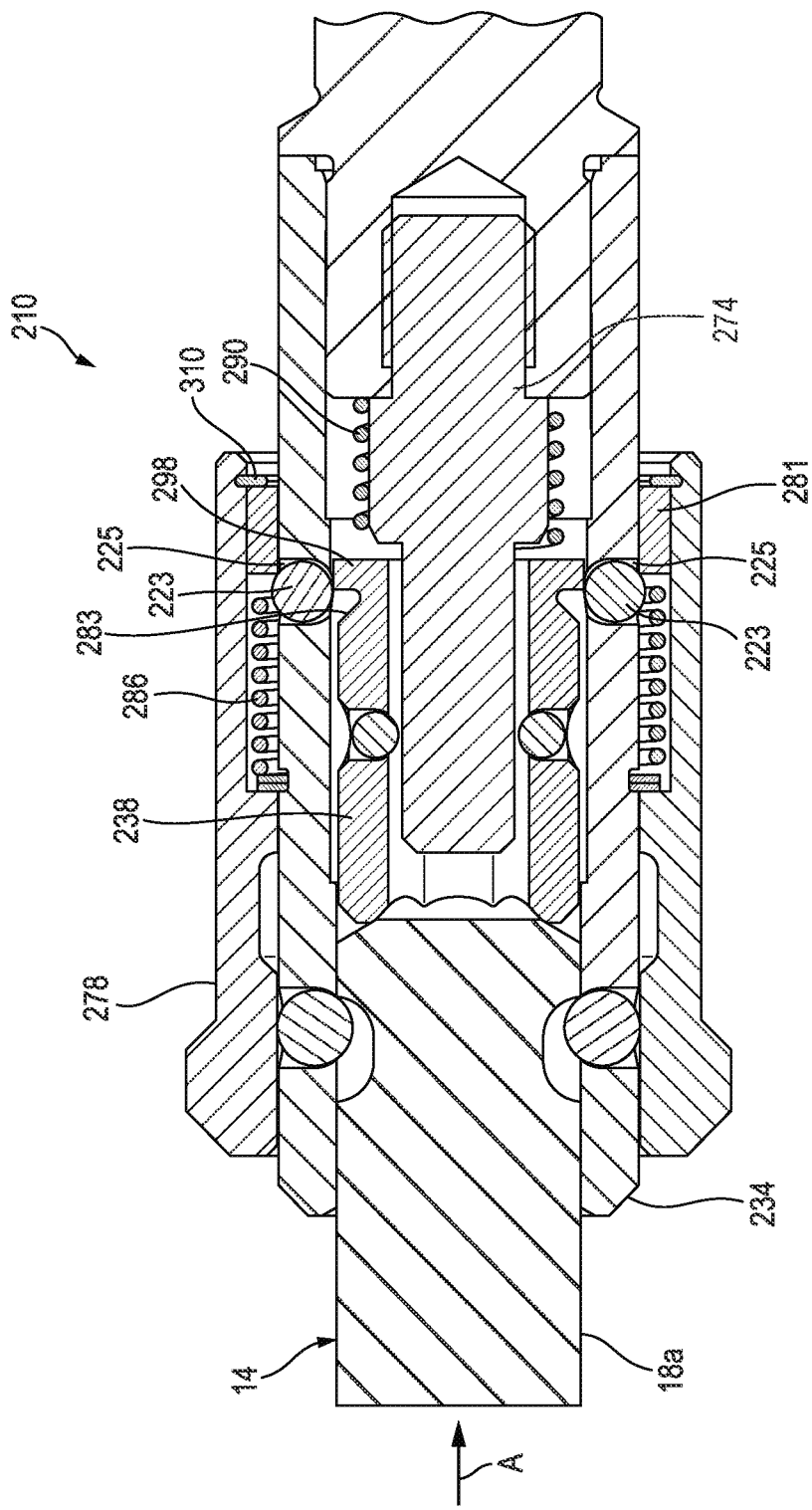
FIG. 6 is a cross-sectional view of a tool bit holder according to another embodiment of the invention.

FIG. 6 illustrates a tool bit holder 210 according to another embodiment. The tool bit holder 210 is similar to the tool bit holder 10 described above with reference to FIGS. 1-3, and features and elements of the tool bit holder 210 corresponding with features and elements of the tool bit holder 10 are given like reference numbers plus '200.' In addition, the following description focuses primarily on differences between the tool bit holder 210 and the tool bit holder 10 for the sake of brevity.

The tool bit holder 210 includes a plurality of third retaining elements 223 received within a plurality of third accommodating bores 225 extending radially through the first sleeve 234. The illustrated bit holder 210 includes two third retaining elements 223 and two third accommodating bores 225, disposed on opposite sides of the first sleeve 234 (i.e. offset from each other by 180 degrees). In other embodiments, the number or spacing of the third retaining elements 223 and third accommodating bores 225 may vary. For example, in some embodiments only a single third retaining element 223 may be used. In the illustrated embodiment, the third retaining elements 223 are ball bearings; however, in other embodiments, the third retaining elements 223 may be pins or the like.

With continued reference to FIG. 6, the collar 278 includes an internal ring member 281 disposed between the first spring 286 and the second retaining ring 310. When the larger bit shank 18a held by the first sleeve 234, the radial flange 298 on the second sleeve 238 engages the third retaining elements 223 and forces them to project radially outward out of the third accommodating bores 225. The internal ring member 281 is engageable with the third retaining elements 223, which prevents movement of the collar 278 forward toward the actuated position. The collar 278 can only be moved toward the actuated position to release the bit shank 18a if the bit shank 18a is first pushed rearward, in the direction of arrow A. This aligns a groove 283 in the second sleeve 238 adjacent the radial flange 298 with the third retaining elements 223, allowing the third retaining elements 223 to move radially inward and out of the path of the internal ring member 281. In other embodiments, the plunger 274 may be extended to be engageable with the back end of the bit shank 18a. In such embodiments, when the bit shank 18a is pushed rearward, the plunger 274 may be configured to move the third retaining elements 223 out of engagement with the internal ring member 281 to permit movement of the collar 278.

The collar 278 can then be actuated and the tool bit 14 removed, assisted by the influence of the second spring 290. The tool bit holder 210 thus inhibits accidental ejection of the tool bit 14 from the tool bit holder 210 by requiring two separate actions to release the bit shank 18a.

Figure 7:
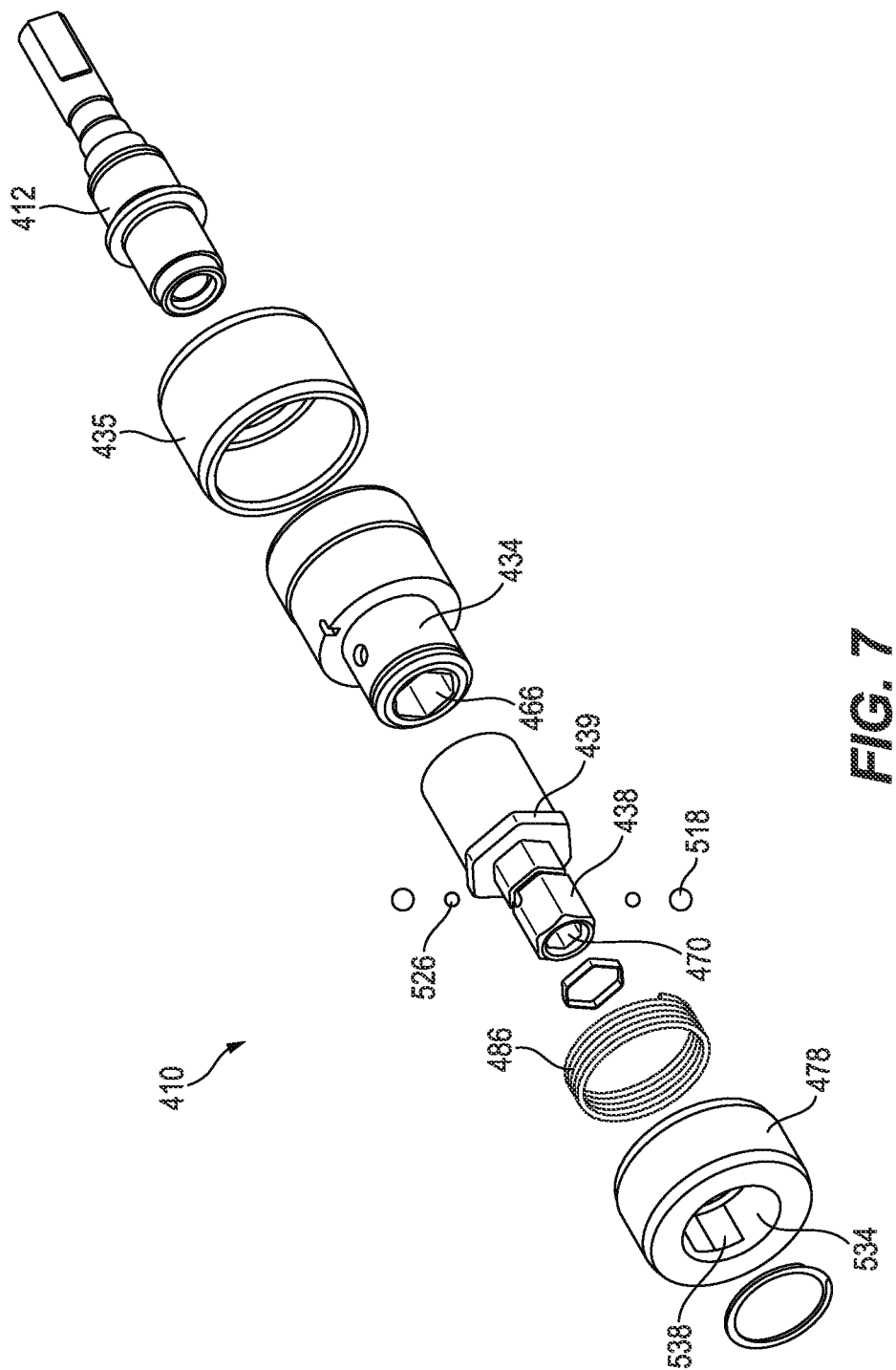
FIG. 7 is an exploded view of a tool bit holder according to another embodiment of the invention.
Figure 8:
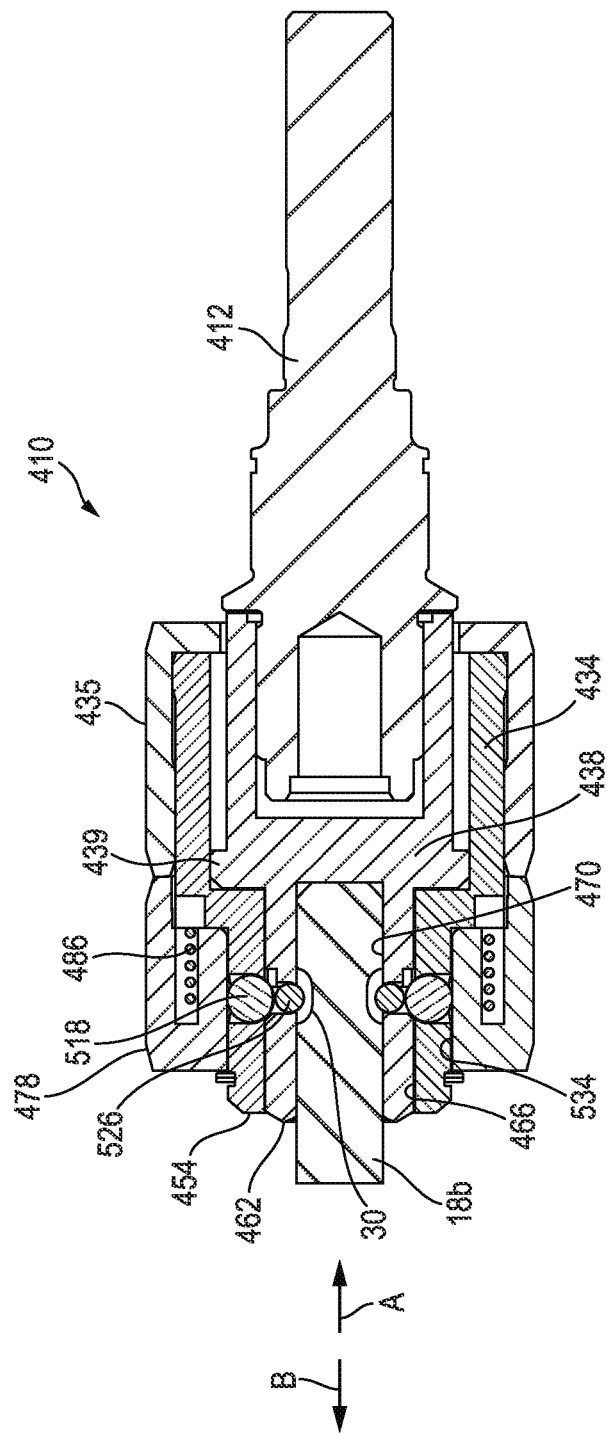
FIG. 8 is a cross-sectional view of the tool bit holder of FIG. 7 retaining a shank of a second nominal size.
Figure 9:
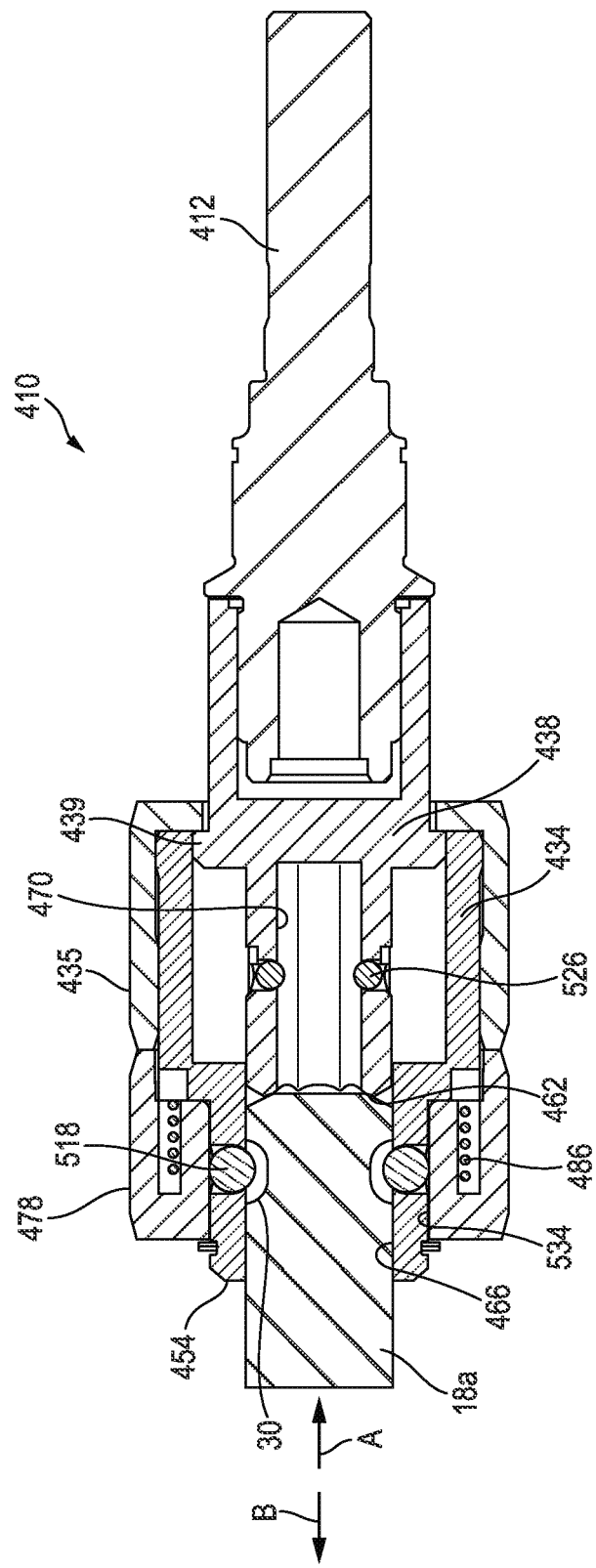
FIG. 9 is a cross-sectional view of the tool bit holder of FIG. 7 retaining a shank of a first nominal size.

FIGS. 7-9 illustrate a tool bit holder 410 according to another embodiment. The tool bit holder 410 is similar to the tool bit holder 10 described above with reference to FIGS. 1-3, and features and elements of the tool bit holder 410 corresponding with features and elements of the tool bit holder 10 are given like reference numbers plus '400.' In addition, the following description focuses primarily on differences between the tool bit holder 410 and the tool bit holder 10 for the sake of brevity.

In the illustrated embodiment of the tool bit holder 410, the second sleeve 438 is fixed to the spindle 412, and the first sleeve 434 is movably coupled to the second sleeve 438. In particular, the first sleeve 434 is axially movable along the second sleeve 438 between a first position (FIG. 8) in which the front end 454 of the first sleeve 434 is generally flush with the front end 462 of the second sleeve 438, and a second position (FIG. 9) in which the front end 454 of the first sleeve 434 projects beyond the front end 462 of the second sleeve 438. When the first sleeve 434 is in the first position, the tool bit holder 410 is configured to receive the smaller bit shank 18b within the bit holding bore 470 of the second sleeve 438. When the first sleeve 434 is in the second position, the tool bit holder 410 is configured to receive the larger bit shank 18a within the bit holding bore 466 of the first sleeve 434.

In the illustrated embodiment, the tool bit holder 410 further includes a retention sleeve 435 surrounding at least a portion of the first sleeve 434. The retention sleeve 435 may be fixed to the first sleeve 434 (e.g., by press-fitting the retention sleeve 435 onto the first sleeve 434) and thus movable with the first sleeve 434 between the first and second positions. In the illustrated embodiment, the first sleeve 434 is engageable with a front side of a shoulder 439 formed on the second sleeve 438 to limit movement of the first sleeve 434 to the first position (FIG. 8), and the retention sleeve 435 is engageable with a back side of the shoulder 439 to limit movement of the first sleeve 434 to the second position (FIG. 9). In some embodiments, the first sleeve 434 and/or the retention sleeve 435 may include one or more retention features (e.g., detents, recesses, ribs, or the like) configured to retain the first sleeve 434 and the first and/or the second positions.

The tool bit holder 410 further includes a collar 478 surrounding at least a portion of the first sleeve 434. In the illustrated embodiment, the collar 478 is disposed adjacent the retention sleeve 435. The collar 478 is coupled to the first sleeve 434 for axial movement therewith. In addition, the collar 478 is rotatable to a limited extent relative to the first sleeve 434 between an initial or unactuated position (illustrated in FIGS. 8-9) and an actuated position. A spring 486, which is a torsion spring in the illustrated embodiment, biases the collar 478 toward the unactuated position.

When the collar 478 is in the initial position, as illustrated in FIGS. 8-9, an annular engagement surface 534 of the collar 478 overlies the first accommodating bores 522 in the radial direction. As such, the engagement surface 534 prevents the first retaining elements 518 from moving to the release position. When the collar 478 is rotated to the actuated position (not shown), a relief 538 (FIG. 7) in the collar 478 aligns with the first retaining elements 518. The first retaining elements 518 can then move outward into the relief 538 to the release position, which in turn may allow the second retaining elements 526 to move outward to the release position.

In use, to couple a tool bit 14 with the larger bit shank 18a to the bit holder 410, a user first pulls the first sleeve 434 forward to the second position of the first sleeve 434 illustrated in FIG. 9. The user then rotates the collar 478 toward the actuated position, against the biasing force of the spring 486. The user then inserts the bit shank 18a into the first bit holding bore 466.

As the bit shank 18a is inserted in the direction of arrow A, the bit shank 18a encounters the first retaining elements 518 and pushes them radially outward and into the relief 538 in the collar 478, such that the first retaining elements 518 are moved to the release position. This allows the back end of the bit shank 18a to clear the first retaining elements 518. The bit shank 18a is fully inserted when it engages the front end 462 of the second sleeve 434. At this point, the groove 30 in the bit shank 18a aligns with the first retaining elements 518. The user can then release the collar 478, which returns forward to the initial position under the influence of the first spring 486.

To eject the bit shank 18a, the user again rotates the collar 478 to the actuated position. The user may then withdraw the bit shank 18a, or the user may move the first sleeve 434 toward its first position, illustrated in FIG. 8, while maintaining the collar 478 in the actuated position. As the first sleeve 434 is moved toward the first position, the end 462 of the second sleeve 438 pushes the bit shank 18a out of the first bit holding bore 466.

To couple a tool bit 14 with the smaller bit shank 18b to the bit holder 10, the user moves the first sleeve 434 to the first position (if it is not already) and then rotates the collar 478 toward the actuated position, against the biasing force of the spring 486. The user then inserts the bit shank 18b into the second bit holding bore 470. As the bit shank 18b continues to be inserted in the direction of arrow A, the bit shank 18b encounters the second retaining elements 526 and pushes them radially outward. The second retaining elements 526 bear against the first retaining elements 518 and push the first retaining elements 518 into the relief 538, such that the first retaining elements 518 and the second retaining elements 526 are moved to the release position. This allows the back end of the bit shank 18b to clear the second retaining elements 526.

The bit shank 18b is fully inserted when the back end of the bit shank 18b engages the back end of the second bit holding bore 470, or another stop or plunger in other embodiments. The user can then release the collar 478, which returns to the initial position under the influence of the spring 486. The first retaining elements 518 move inward to the secured position and bear against the second retaining elements 526, which moves the second retaining elements 526 inward to the secured position. The second retaining elements 526 project into the groove 30, thereby axially retaining the bit shank 18b.

Figure 10:
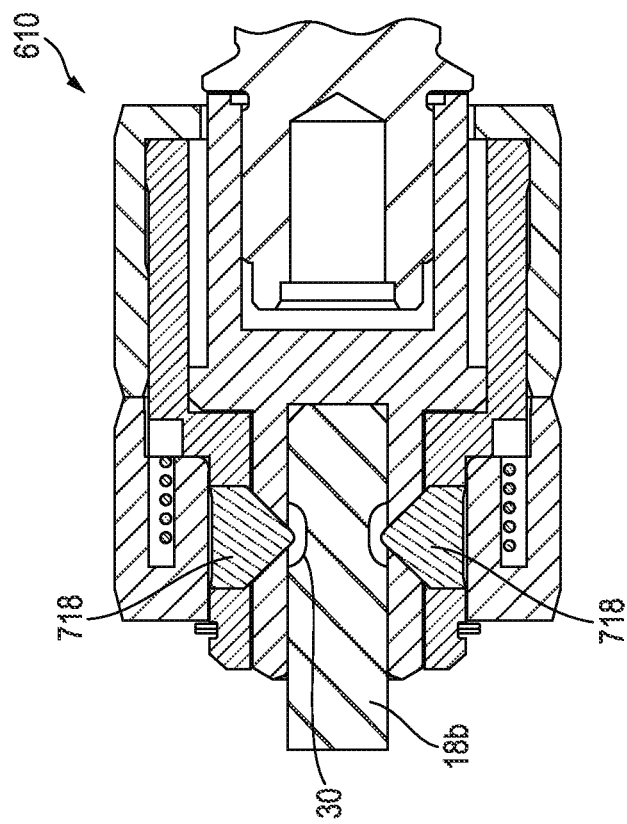
FIG. 10 is a cross-sectional view of a tool bit holder according to another embodiment of the invention, with a plurality of retaining elements illustrated in a first securing position.

FIGS. 10-10C illustrate a tool bit holder 610 according to another embodiment. The tool bit holder 610 is similar to the tool bit holder 410 described above with reference to FIGS. 7-9, and features and elements of the tool bit holder 610 corresponding with features and elements of the tool bit holder 410 are given like reference numbers plus '200.' In addition, the following description focuses primarily on differences between the tool bit holder 610 and the tool bit holder 410 for the sake of brevity.

The illustrated tool bit holder 610 includes a first plurality of retaining elements 718 formed as tapered pins. The retaining elements 718 in the illustrated embodiment may extend through both the first sleeve 634 and the second sleeve 638, such that only a single set of retaining elements 718 is required. The collar 678 may include a plurality of stepped reliefs (not shown) to allow the retaining elements 718 to have a plurality of securing and/or release positions or depths (e.g., a first securing position illustrated in FIG. 10, a first release position illustrated in FIG. 10A, a second release position illustrated in FIG. 10B, and a second securing position illustrated in FIG. 10C, thereby accommodating differently sized shanks 18a, 18b, and optionally grooves 30 of different depths.

Figure 11:
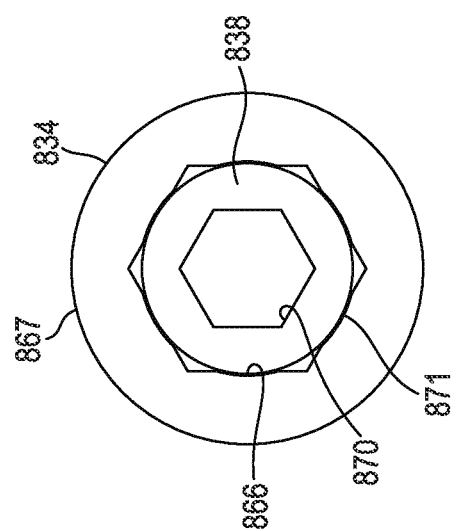
FIG. 11 is an end view of a first sleeve and a second sleeve according to an embodiment.

FIG. 11 illustrates a first sleeve 834 and a second sleeve 838 according to another embodiment. The first sleeve 834 and the second sleeve 838 may be incorporated into any of the tool bit holders 10, 210, 410, 610 described above, for example.

The bit holding bore 870 of the second sleeve 838 includes a non-circular inner geometric profile (e.g., a hexagonal profile in the illustrated embodiment). The second sleeve 838 further includes an outer surface 871 with a circular profile or cylindrical shape. A portion of the outer surface 871 (e.g., near the rear end of the second sleeve 838) may include a non-circular profile to maintain a torque-transmitting coupling between the bit holding bore 866 of the first sleeve 834 and the second sleeve 838. Because the circular profile of the outer surface 871 can be ground to tight tolerances, run-out during operation may be reduced.

Thus, the present invention provides, in some aspects, a tool bit holder configured to quickly receive and retain tool bit shanks of at least two different nominal sizes, without the abovementioned deficiencies of a continuously variable chuck.

Various features of the invention are set forth in the following claims.

What is claimed is:

1. A multi-size tool bit holder comprising:
a first sleeve including a first bit holding bore extending along an axis and a first accommodating bore extending through a sidewall of the first bit holding bore;
a second sleeve coupled for co-rotation with the first sleeve and movable relative to the first sleeve between a first position and a second position, the second sleeve including a second bit holding bore extending along the axis and a second accommodating bore extending through a sidewall of the second bit holding bore; and
a tapered retaining element,
wherein a first bit shank of a first nominal size is insertable into the first bit holding bore when the second sleeve is in the second position to secure the first bit shank within the first sleeve,
wherein a second bit shank of a second nominal size different than the first nominal size is insertable into the second bit holding bore when the second sleeve is in the first position to secure the second bit shank within the second sleeve, and
wherein said tapered retaining element has a first securing position in which the tapered retaining element extends through the first and second accommodating bores when the second sleeve is in the first position and into a groove in the second bit shank to axially secure the second bit shank within the second sleeve.

2. The multi-size tool bit holder of claim 1, wherein the first accommodating bore is radially aligned with the second accommodating bore when the second sleeve is in the first position.

3. The multi-size tool bit holder of claim 1, wherein the second sleeve is movable between the first position and the second position along the first bit holding bore.

4. The multi-size tool bit holder of claim 1, wherein first bit holding bore and the second bit holding bore are hexagonal, and wherein the first nominal size is larger than the second nominal size.

5. The multi-size tool bit holder of claim 1, wherein said tapered retaining element is movable in a direction transverse to the axis from the first securing position to a first release position in which said tapered retaining element is withdrawn from the second bit holding bore.

6. The multi-size tool bit holder of claim 5, said tapered retaining element has a second securing position in which said tapered retaining element extends through the first accommodating bore when the second sleeve is in the second position and into a groove in the first bit shank to axially secure the first bit shank within the first sleeve.

7. The multi-size tool bit holder of claim 6, wherein said tapered retaining element has a second release position in which said tapered retaining element is withdrawn from the first bit holding bore.

8. The multi-size tool bit holder of claim 7, wherein said tapered retaining element is a tapered pin.

9. The multi-size tool bit holder of claim 1, wherein said retaining element is one of a plurality of tapered retaining elements.

10. The multi-size tool bit holder of claim 1, further comprising a spindle configured for connection to a rotary power tool, wherein the first sleeve is coupled for co-rotation with the spindle about the axis.

11. A multi-size tool bit holder comprising:
a first sleeve including a sidewall surrounding a first bit holding bore, wherein the first bit holding bore extends along an axis and is configured to receive a first bit shank;
a second sleeve coupled for co-rotation with the first sleeve and movable relative to the first sleeve along the axis between a first position and a second position, the second sleeve including a sidewall surrounding a second bit holding bore, wherein the second bit holding bore extends along the axis and is configured to receive a second bit shank;
a plurality of tapered retaining elements movable between a first securing position in which the plurality of tapered retaining elements projects into the second bit holding bore, a first release position in which the plurality of tapered retaining elements is withdrawn from the second bit holding bore, a second securing position in which the plurality of tapered retaining elements projects into the first bit holding bore, and a second release position in which the plurality of tapered the retaining is withdrawn from the first bit holding bore; and
a collar surrounding the first sleeve such that the collar at least partially overlaps the first sleeve in a radial direction.

12. The multi-size tool bit holder of claim 11, wherein the first sleeve includes a plurality of first accommodating bores extending through the sidewall of the first sleeve, and the second sleeve includes a plurality of second accommodating bores extending through the sidewall of the second sleeve.

13. The multi-size tool bit holder of claim 12, wherein each tapered retaining element of the plurality of tapered retaining elements extends through one of the plurality of first accommodating bores and one of the plurality of second accommodating bores in the first securing position.

14. The multi-size tool bit holder of claim 11, wherein each tapered retaining element of the plurality of tapered retaining elements is movable in a direction transverse to the axis.

15. The multi-size tool bit holder of claim 11, wherein each tapered retaining element of the plurality of tapered retaining elements is a tapered pin.

16. The multi-size tool bit holder of claim 11, further comprising a spindle configured for connection to a rotary power tool, wherein the first sleeve is coupled for co-rotation with the spindle about the axis.

17. The multi-size tool bit holder of claim 11, wherein the first sleeve surrounds the second sleeve.

18. The multi-size tool bit holder of claim 17, wherein the second sleeve is movable between the first position and the second position along the first bit holding bore.

* * * * *